United States Patent
Abali et al.

(10) Patent No.: US 10,803,040 B2
(45) Date of Patent: *Oct. 13, 2020

(54) EFFICIENT AND ACCURATE LOOKUPS OF DATA BY A STREAM PROCESSOR USING A HASH TABLE

(71) Applicant: INTERNATIONAL BUSINESS MACHINES CORPORATION, Armonk, NY (US)

(72) Inventors: Bulent Abali, Tenafly, NJ (US); Bartholomew Blaner, Shelburne, VT (US); John J. Reilly, Huntington, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 440 days.

This patent is subject to a terminal disclaimer.

(21) Appl. No.: 15/688,493

(22) Filed: Aug. 28, 2017

(65) Prior Publication Data

US 2019/0065493 A1    Feb. 28, 2019

(51) Int. Cl.
*G06F 16/22* (2019.01)
*G06F 12/0866* (2016.01)
(Continued)

(52) U.S. Cl.
CPC ...... *G06F 16/2255* (2019.01); *G06F 12/0246* (2013.01); *G06F 12/0866* (2013.01); *G06F 16/90344* (2019.01); *H04L 67/2828* (2013.01)

(58) Field of Classification Search
CPC .......... G06F 16/2255; G06F 16/90344; G06F 12/0246; G06F 12/0866; G06F 17/30; G06F 12/02; H04L 67/2828
(Continued)

(56) References Cited

U.S. PATENT DOCUMENTS 5,016,009 A    5/1991    Whiting et al.
5,153,591 A    10/1992    Clark
(Continued)

OTHER PUBLICATIONS

Demetriades et al, "An Efficient Hardware-based Multi-hash Scheme for High Speed IP Lookup", High Performance Interconnects, 2008, HOTI'08, IEEE, 2008, 8 pages.
(Continued)

*Primary Examiner* — Hicham Skhoun
(74) *Attorney, Agent, or Firm* — Bryan Bortnick; Amy J. Pattillo

(57) ABSTRACT

Responsive to a data lookup in a buffer triggered for a search string, a processor searches for a selection of pairs from among multiple pairs of a hash table read from at least one address hash of the search string and matching at least one data hash of the search string, each row of the hash table assigned to a separate address hash, each of the pairs comprising a pointer to a location in the buffer and a tag with a previous data hash of a previously buffered string in the buffer. The processor identifies, from among the selection of pairs, at least one separate location in the buffer most frequently pointed to by two or more pointers within the selection of pairs. The processor, responsive to at least one read string from the buffer at the at least one separate location matching at least a substring of the search string, outputs the at least one separate location as the response to the data lookup.

12 Claims, 7 Drawing Sheets

(51) Int. Cl.
*G06F 12/02* (2006.01)
*G06F 16/903* (2019.01)
*H04L 29/08* (2006.01)

(58) Field of Classification Search
USPC .......................................................... 707/747
See application file for complete search history.

(56) References Cited

U.S. PATENT DOCUMENTS

| | | | |
|---|---|---|---|
| 5,281,967 A | 1/1994 | Jung | |
| 6,681,305 B1 | 1/2004 | Franke et al. | |
| 6,944,740 B2 | 9/2005 | Abali et al. | |
| 7,433,355 B2 | 10/2008 | Wilson et al. | |
| 7,493,224 B2 | 2/2009 | Levine et al. | |
| 8,832,034 B1* | 9/2014 | Ramarao | G06F 16/1748 |
| | | | 707/664 |
| 2001/0043614 A1* | 11/2001 | Viswanadham | H04L 49/602 |
| | | | 370/469 |
| 2011/0191756 A1* | 8/2011 | Shinjo | G06F 16/185 |
| | | | 717/141 |
| 2011/0208747 A1 | 8/2011 | Huang | |
| 2013/0147643 A1 | 6/2013 | Abali et al. | |
| 2013/0185319 A1 | 7/2013 | Reilly | |
| 2013/0326528 A1* | 12/2013 | Shankar | G06F 9/4881 |
| | | | 718/103 |
| 2017/0139744 A1* | 5/2017 | Pillar | G06F 9/5016 |
| 2018/0059966 A1* | 3/2018 | Lee | G06F 3/0631 |

OTHER PUBLICATIONS

"Basics of streams processing applications", copyright IBM, accessed via the Internet from <https://www.ibm.com/support/knowledgecenter/en/SSCRJU_4.1.1/com.ibm.streams.dev.doc/doc/streaming_application_basics.html>, as of Jul. 27, 2017, 2 pages.

Mahoney, Matt, "The ZPAQ Compression Algorithm", available via the Internet at <http://mattmahoney.net/dc/zpaq_compression.pdf>, Dec. 29, 2015, 18 pages.

"List of IBM Patents or Patent Applications Treated as Related", dated Oct. 27, 2016, 2 pages.

U.S. Appl. No. 15/795,248, filed Oct. 26, 2017, In re Abali, 39 pages.

"List of IBM Patents or Patent Applications Treated as Related", dated Oct. 26, 2016, 2 pages.

USPTO Non-final Office Action, dated Jan. 22, 2020, in re Abali, U.S. Appl. No. 15/795,249, filed Oct. 26, 2017.

USPTO Notice of Allowance, dated Jun. 10, 2020, In re Abali, U.S. Appl. 15/795,248, filed Oct. 26, 2017, 14 pages.

* cited by examiner

EFFICIENT AND ACCURATE LOOKUPS OF DATA BY A STREAM PROCESSOR USING A HASH TABLE

BACKGROUND

1. Technical Field

One or more embodiments of the invention relate generally to data processing and particularly to efficient and accurate data lookups by a stream processor using a hash table.

2. Description of the Related Art

Buffers are used by stream processors, which manage one or more streaming applications, to store streams of data. Stream processing applications look up previously stored streams of data to determine whether there is a match to a current search string.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprising program instructions, responsive to a data lookup in a buffer triggered for a search string, to parse the search string into a plurality of tokens, each of the plurality of tokens of a first byte length shorter than a string byte length of the search string, each of the plurality of tokens comprising a staggered selection of bytes of the search string overlapping one another by at least one byte. The stored program instructions comprising program instructions to hash each of the plurality of tokens into a respective address hash of a plurality of address hashes, each respective address hash of a second bit length shorter than the first byte length. The stored program instructions comprising program instructions to hash each of the plurality of tokens into a respective data hash of a plurality of data hashes, each respective data hash of a third bit length shorter than the second bit length. The stored program instructions comprising program instructions to search for a selection of pairs from among a plurality of pairs of a hash table read from at least one address hash of the plurality of address hashes and matching at least one data hash of the plurality of data hashes, each row of a plurality of rows of the hash table assigned to a separate address hash, each of the plurality of pairs comprising a pointer to a location in the buffer and a tag with a previous data hash of a previously buffered string in the buffer. The stored program instructions comprising program instructions to identify, from among the selection of pairs, at least one separate location in the buffer most frequently pointed to by two or more pointers within the selection of pairs. The stored program instructions comprising program instructions, responsive to at least one read string from the buffer at the at least one separate location matching at least a substring of the search string, to output the at least one separate location as the response to the data lookup.

In another embodiment, a computer program product comprises a computer readable storage medium having program instructions embodied therewith. The computer readable storage medium is not a transitory signal per se. The program instructions are executable by a computer to cause the computer to, responsive to a data lookup in a buffer triggered for a search string, parse, by the computer, the search string into a plurality of tokens, each of the plurality of tokens of a first byte length shorter than a string byte length of the search string, each of the plurality of tokens comprising a staggered selection of bytes of the search string overlapping one another by at least one byte. The program instructions are executable by a computer to cause the computer to hash, by the computer, each of the plurality of tokens into a respective address hash of a plurality of address hashes, each respective address hash of a second bit length shorter than the first byte length. The program instructions are executable by a computer to cause the computer to hash, by the computer, each of the plurality of tokens into a respective data hash of a plurality of data hashes, each respective data hash of a third bit length shorter than the second bit length. The program instructions are executable by a computer to cause the computer to search, by the computer, for a selection of pairs from among a plurality of pairs of a hash table read from at least one address hash of the plurality of address hashes of the and matching at least one data hash of the plurality of data hashes, each row of a plurality of rows of the hash table assigned to a separate address hash, each of the plurality of pairs comprising a pointer to a location in the buffer and a tag with a previous data hash of a previously buffered string in the buffer. The program instructions are executable by a computer to cause the computer to identify, by the computer, from among the selection of pairs, at least one separate location in the buffer most frequently pointed to by two or more pointers within the selection of pairs. The program instructions are executable by a computer to cause the computer, responsive to at least one read string from the buffer at the at least one separate location matching at least a substring of the search string, to output, by the computer, the at least one separate location as the response to the data lookup.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
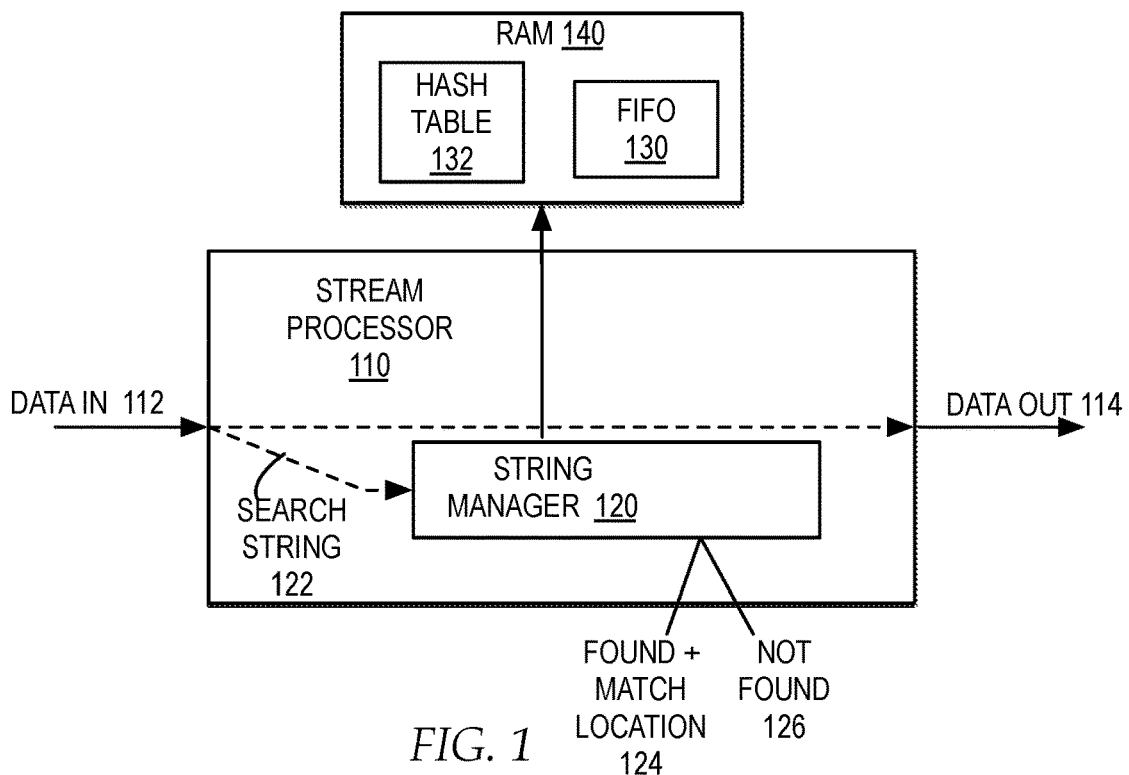
FIG. 1 illustrates a block diagram of one example of a stream processor for efficiently and accurately managing caching and lookup of streaming data input for stream processing applications in which fast data lookup is implemented.

FIG. 1 illustrates a block diagram of one example of a stream processor for efficiently and accurately managing caching and lookup of streaming data input for stream processing applications in which fast data lookup is implemented.

In one example, a stream processor 110 may represent an accelerator, comprising one or more processors, implemented for efficiently and accurately processing streams of data. In one example, stream processor 110 may apply to one or more types of stream processing applications that implement a hash table 132 for managing a directory into buffered data and for facilitating efficient and accurate lookups of the buffered data. In general, stream processor 110 may implement a collection of operators, all of which process streams of data. In one example, stream processor 110 may represent one or more coprocessors, and may include shared resources used by a hypervisor for stream processing application such as, but not limited to, encryption for file systems, encryption for standard application programming interfaces (APIs), random number generation, and compression. In additional or alternate embodiments, stream processor 110 may perform additional or alternate types of stream processing applications.

In one example, stream processor 110 may manage receiving a stream of data from one source, as illustrated by data in 112, may perform one or more stream application functions, and may manage passing the processed stream of data to another location, as illustrated by data out 114. In one example, a string manager 120 may represent a component of stream processor 110 specified for performing a particular stream application function by stream processor 110.

In one example, stream processor 110 may implement one or more buffers, tables arrays, and other data structures for managing the processing of a stream of data. In one example, stream processor 110 may store a last large chunk of streamed input data, from data in 112, such as the last 32 KB of input data, in a random access memory (RAM) 140 organized as a first-in first-out (FIFO) buffer, such as FIFO 130. In one example, stream processor 110 may also manage a hash table 132 in RAM 140, where hash table 132 is managed to provide a dictionary of string locations in FIFO 130. In one example, RAM 140 may represent a same RAM or static RAM (SRAM) chip or card or multiple RAM or SRAM chips or cards. In one example, FIFO 130 and hash table 132 may be managed on the same or different RAM chips or cards.

In one example, data to be processed by stream processor 110 may arrive in chunks smaller than the 32 KB FIFO buffer, such as 8 bytes per clock cycle. In one example, string manager 120 may receive the 8-byte chunk as a search string 122. In general, where a hash table 132 is implemented to manage a dictionary of string locations in FIFO 130, string manager 120 may search hash table 132 for a pointer into FIFO 130 related to search string 122 and determines a response of either "found" and the location of the data matching search string 122 in FIFO 132, as illustrated at reference numeral 124, or determines a response of "not found", as illustrated at reference numeral 126.

In one example, if the stream application performed by stream processor 110 is compression, the data to be compressed may arrive in smaller chunks to string manager 120 as search string 122, such as 8 bytes per clock cycle. In one example, using the Lempel-Ziv (LZ) compression method, string manager 120 may replace duplicate strings in the input string of data in 112 by a pointer to an earlier copy, where the pointer encodes the string with a smaller number of bits, which results in compression of input data. In one example, string manager 120 compares search string 122 to data in FIFO 130 and if search string 122 matches data in FIFO 130, indicating a "found" and match location, string manager 120 replaces search string 122 within data in 112 with a pointer to FIFO 130, including a distance and length pair, which is then output to the output stream, as data out 114. In one example, the pointer provides an instruction to a decompressor of how to recreate the original data stream input from the compressed data. In one example, if search string 122 does not occur anywhere in FIFO 130, search string 122 is emitted as a sequence of literal bytes in data out 114.

In one example, to quickly search for search string 122 in FIFO 130, string manager 120 may manage hash table 132 for providing a directory for fast lookups of data in search string 122 matching data in FIFO 130, with minimal RAM and power overhead. In particular, string manager 120 may hash search string 122 using one or more types of hash functions, to compute an index into an array of bucket or slots of hash table 132, where a pointer to FIFO 130 is located at the index to hash table 132. String manager 120 may also store search string 122 at the tail of FIFO 130 and adds a pointer to search string 122 in FIFO 130 at the computed index in hash table 132. In one example, the hashed index, or hash address, may be fewer bits than the number of bits in search string 122, which minimizes the amount of memory overhead required for maintaining a directory of pointers in hash table 132, pointing to locations of search strings buffered in FIFO 130. However, a general limitation of hash functions, which hash one value of a first length to a second value of a shorter length, is that the hash function may cause hash collisions where the hash function generates the same index for more than one search string key, yielding some level of error.

In contrast, while the example in FIG. 1 illustrates FIFO 130 implemented on RAM 140 with hash table 132, if FIFO 130 is implemented as a content addressable memory (CAM) without hash table 132, a CAM may not have the collision-based level of error of hash table 132, however a CAM based FIFO may be limited in implementation to a size that is smaller than the size needed for full compressor implementation. In one example, in a CAM, the contents may be read by content value rather than by address. If FIFO 130 were implemented as a CAM, search string 122 may be fed into the CAM, which compares the input search data against a table of stored data, searching the entire content in parallel, and return a hit with a matching address or a miss, in one cycle, without any collision-based error. The CAM, however, consumes a large silicon area and significant amount of power, limiting the functional size of the CAM, which limits the size of FIFO 130, and as a result limits the size of the data block that can be compressed against. For example, production of a CAM may be functionally limited to 4 KB, while a FIFO of 32 KB is recommended for the full implementation of a compressor.

In one embodiment of the invention, to provide for efficient and accurate data lookup, while implementing a 32 KB or larger FIFO, which is a larger size than functionally available from a CAM, and to use less power than a CAM, string manager 120 and hash table 132 are optimized in RAM 140 to minimize the collision-based level of error introduced by hash table 132. In particular, in one example, string manager 120 and hash table 132 are optimized to minimize the percentage chance that if two different strings hash to a same hash address in hash table 132 that the FIFO location of the strings is forgotten or the wrong string is read from the FIFO location.

Figure 2:
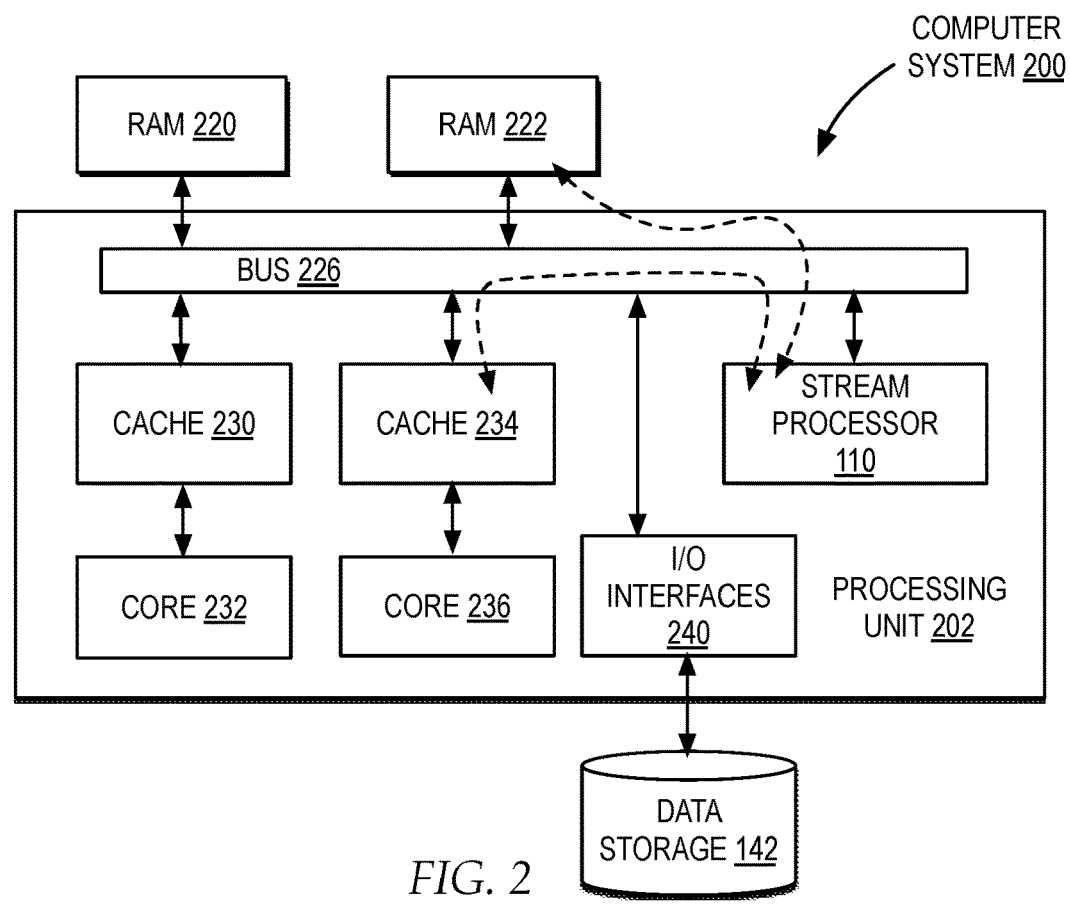
FIG. 2 illustrates a block diagram of one example of a stream processor within a computer system for efficiently and accurately managing caching of streaming data input for stream processing applications using a hash table for data lookups to a FIFO.

FIG. 2 illustrates a block diagram of one example of a stream processor within a computer system for efficiently and accurately managing caching of streaming data input for stream processing applications using a hash table for data lookups to a FIFO.

In one example, a computer system 200 may include a processing unit 202 with one or more cores, such as core 232 and core 236, sharing one or more stream processors, such as stream processor 110, via a bus 226. In one example, processing unit 202 may represent a chip with each processor core representing a separate core integrated onto the chip. In one example, each core may be coupled to separate cache connected to bus 226, such as core 232 coupled to cache 230 and core 236 coupled to cache 234. In one example, one or more memory devices, such as random access memory (RAM) 220 and RAM 222 may be communicatively connected via bus 226 within computer system 200. One or more input/output (I/O) interfaces 240 may be coupled to bus 226 for communication with one or more adapters and I/O devices, such as data storage 242. In additional or alternate embodiments, processing unit 202 may include additional or alternate cores with additional or alternate cache connected to bus 226. In additional or alternate embodiments, computer system 200 may include multiple processing units connected in processing nodes, and may include multiple processing nodes, connected in a server system. In additional or alternate embodiments, processing unit 202 may be communicatively connected to additional processing units, processing nodes, or other processing systems via connections to bus 226, creating a system fabric of connections. FIG. 2 is illustrated as one example of stream processor 110 implemented in a computer system with multiple cores and memory. In additional or alternate embodiments, stream processor 110 may be implemented in other computer systems that include one or more cores and memory.

In one example, stream processor 110 may represent an accelerator, comprising one or more coprocessors, implemented for efficiently and accurately processing streams of data within processing unit 202. In one example, where stream processor 110 performs data compression, stream processor 110 may allow some of the compression processing within processing unit 202 to be offloaded from core 232 and core 236 to reduce the amount of processor overhead involved in compression and decompression within processing unit 202. In one example, each selection of core and cache, such as cache 130 with core 132 and cache 134 with core 136, may each be logically partitioned into one more logical partitions, where are subsets of hardware resources, virtualized as separate computers. In one example, each of the logical partitions of processing unit 202 may request to access stream processor 110 for offloading compression processing. In one example, where multiple logical partitions request to access stream processor 110 for compression at the same time, stream processor 110 may provide access on a first-in first-out (FIFO) basis or another selected basis.

In one example, within processor system 100, including multiple processing units, such as processing unit 102, processor system 100 may divide processor and memory units into symmetric multiprocessing (SMP) affinity domains. In one example, an affinity domain may refer to a group of processing units which have similar memory and cache access times. In one example, within processor system 100, one or more of RAM 120 and RAM 122, as physical memory, may be placed in the same affinity domain as stream processor 110 in order to optimize performance from local memory compression pools implemented by stream processor 110 for compressing data streams.

In one example, stream processor 110 may receive data streams for compression from an LPAR of processing unit 202, including cache 230 or cache 234, and manage data compression in hash table 132 and FIFO 132 within RAM 220, as illustrated, and output of a data out stream for decompression of the compressed data stream. In one example, to minimize the memory overhead and power required to compress streams of data from multiple LPARs in processing unit 202, stream processor 110 may manage hash table 132 and FIFO 132 in local memory compression pools available in RAM 220 and RAM 222 optimized for the affinity domain including stream processor 110. In addition, in one example, to minimize the collision-based level of error introduced by hash table 132, stream processor 110 implements string manager 120 and hash table 132, which are optimized to minimize the percentage chance that if two different strings hash to a same hash address in hash table 132 that the FIFO location of the strings is forgotten or the wrong string is read from the FIFO location.

Figure 3:
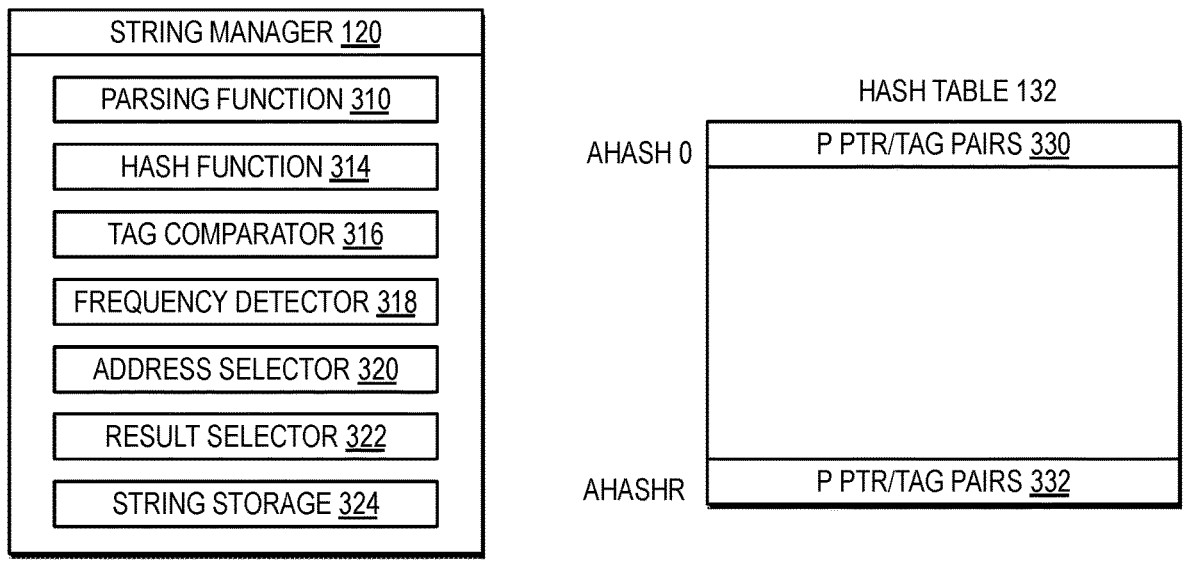
FIG. 3 illustrates a block diagram of one example of a string manager and hash table optimized to minimize the collision-based level of error introduced by the hash table for efficient and accurate data lookups in a FIFO.

FIG. 3 illustrates a block diagram of one example of a string manager and hash table optimized to minimize the collision-based level of error introduced by the hash table for efficient and accurate data lookups in a FIFO.

In one example, stream processor 110 performs a stream management application of compression. In one example, stream processor 110 performs compression using a LZ encoder function that compresses data by replacing duplicate strings in the data with pointers to the historical data, buffered in FIFO 130. In one example, a pointer may represent a pair including a distance and a length, which instructs that the current input string matches a copy of the string in FIFO 130 a particular number of distance bytes away, backwards, and at a particular length. In one example, distances may be limited to 32 KB and lengths may be limited to 258 bytes. In additional or alternate embodiments, other types of encoder functions may be implemented for compression.

In one example, hash table 132 is optimized to simulate a dynamic dictionary that performs like a CAM, but requiring less silicon space to implement the data structure and less power to function than a CAM, and allows for a larger FIFO 130. In one example, string manager 120 is optimized to manage hash table 132 to minimize the collision-based level of error introduced by hash table 132, for efficient and accurate data lookups in FIFO 130.

In one example, to minimize the collision-based level of error introduced by hash table 132, for efficient and accurate data lookups by string manager 120, hash table 132 may be organized in an SRAM array of "R" rows. In one example, hash table 132 may be configured to "R" rows of 2048 rows and FIFO 130 may be organized as a 32 KB buffer in an SRAM. In one example, hash table 132 is configured to include each row includes "P" pointer and tag (PTR/TAG) pairs, with each pointer pointing to a location in FIFO 130 and each tag representing a hash of a portion of a data string. In one example, "P" is set to 8, to organize 8 pairs of pointer and tag per row, such as P PTR/TAG PAIRS 330 at one row in hash table 132 and P PTR/TAG PAIRS 330 at another row in hash table 132.

In one example, streaming data is received by stream processor 110 in "X" byte chunks, such as an 8-byte chunk. String manager 120 includes a parsing function 310 for parsing the 8-byte chunk of data into "Y" tokens that are "T" bytes long. In one example, "Y" is set to 8 and "T" is set to 3. In one example, parsing function 310 parses the 8-byte chunk into eight 3 byte chunks, each staggered by 1 byte, with each 8-byte chunk referred to as a token.

Next, a hash function 314 of string manager 120 may perform a first hash of each token into a "K" bit address hash that is an address into hash table 132, referred to as an AHASH. In one example, "K" is set to 11. In addition, hash function 314 may perform a second hash of each token into a "L" bit address hash that is a data tag, referred to as a DHASH. In one example, a DHASH may represent a summary of a token, which is smaller than the token and the AHASH. For example, a DHASH may be set to 6 bits, for a 3-byte token, requiring less overhead for storing a summary of a token than the token itself.

In one example, for each token, a tag comparator 316 of string manager 120 compares the DHASH with each TAG in the P PTR/TAG pairs matching the AHASH of the token. In one example, for each comparison of a DHASH and TAG that is returned as "TRUE", indicating a match, tag comparator 316 may mark the pointer associated with the TAG as valid. For each comparison of a DHASH and TAG that is returned as "FALSE", indicating there is not a match, tag comparator 316 may mark the pointer associated with the TAG is not valid.

In the example, by generating both an AHASH of a token into a row of hash table 132 and a shorter DHASH of the token to compare with a previous DHASH stored as a tag, comparison of the DHASH with the tag enables tag comparator 316 to verify, with a high probability, if two tokens hashing to a same hash row in hash table 132 are the same or different, to minimize errors in fast lookup of data in FIFO 130 using hash table 132. In particular, the probability of a collision of a same AHASH value calculated for two different tokens is minimized by also comparing the DHASH value of each token with a previously computed DHASH for filtering out false positives. Further, the probability of forgetting a pointer in hash table 132 is minimized by maintaining the most recent 8 pairs of each of a pointer and DHASH for each AHASH.

In one example, a frequency detector 318 of string manager 120 determines the frequency at which each FIFO location is pointed to by pointers marked as valid. In one example, the higher the frequency at which each FIFO location is pointed to by pointers marked as valid, the more likely the string pointed to at the FIFO location is longer.

In one example, an address selector 320 of string manager 120 selects pointers to the two most frequent locations pointed to by pointers marked as valid and reads the buffered strings pointed to by each of the pointers from FIFO 130. In one example, the two most frequent locations pointed to by pointers marked as valid, most likely point to the longest buffered strings in FIFO 130 that match all or a portion of the input search string.

In one example, a result selector 322 determines whether the returned buffered strings match the input search string, and if the returned buffered strings match the input search string, determines which string is longer. Result selector 322 may replace the longer matching string portion of the input search string with the pointer to the matching buffered string in FIFO 130, for output. In one example, the pointer to the matching buffered string is shorter than the bytes replaced, resulting in a compressed data stream. In one example, if result selector 322 determines that the returned buffered string does not match the input search string, result selector 322 protects against a "false positive" by outputting the input search string, rather than the selected pointer for the returned buffered string.

In one example, as P size data chunks of a search string are received by stream processor 110, stream processor may write the search string to the tail of FIFO 130, and advance the tail of FIFO 130 to the end of the buffered string. In one example, once tag comparator 316 reads each of the PTR/TAG pairs in hash table 132, tag comparator 316 may shift the table rows to the right, shifting out the right most, oldest entry. A string storage 324 may write the pointer to the FIFO location written to at the tail of FIFO 130 for the PTR and write the DHASH to the TAG for each entry pointed to by an AHASH for each of the 8 tokens. In the example, the DHASH stored in each tag represents a summary of each token that is smaller than the token. In the example, string storage 324 may implement a first in, first out replacement policy for PTR/TAG pairs, retaining the most recent pointers and discarding the least recent pointers. In one example, by maintaining the most recent 8 pairs of each of a pointer and DHASH for each AHASH, the probability of forgetting a pointer is minimized and the probability of an AHASH collision resulting in an error is minimized by the storage of a DHASH with each pointer for filtering out false positives.

Figure 4:
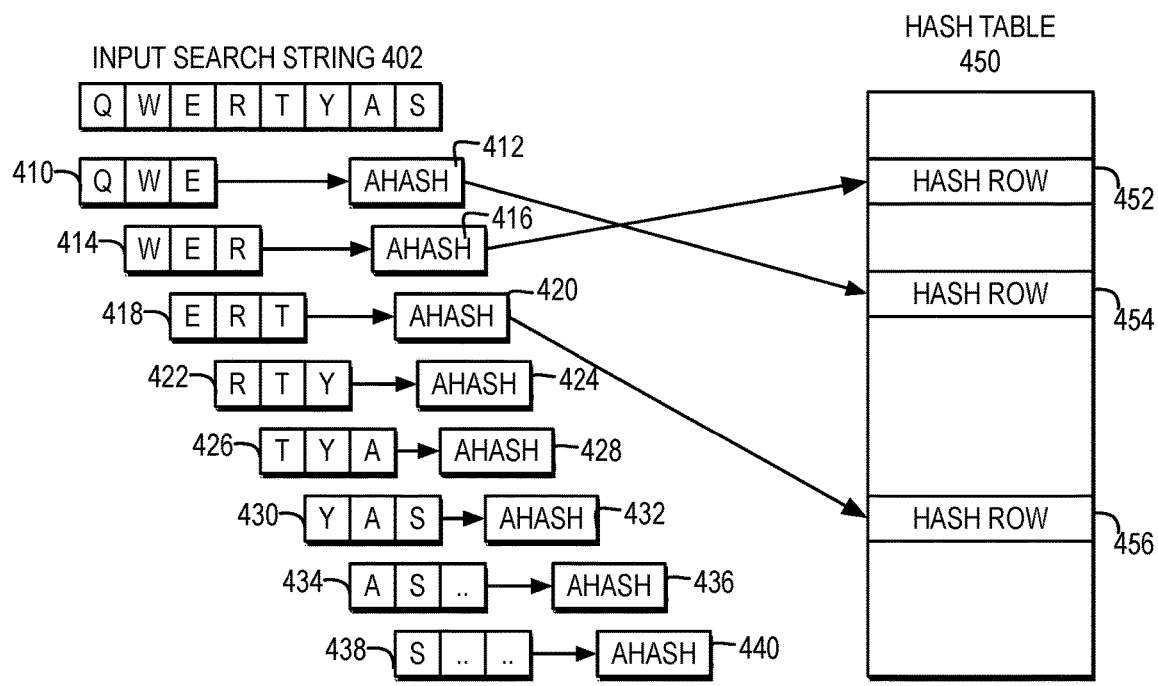
FIG. 4 illustrates a block diagram of one example of an input search string decomposed into tokens which are each hashed to generate hash array addresses into a hash table.

FIG. 4 illustrates a block diagram of one example of an input search string decomposed into tokens which are each hashed to generate hash array addresses into a hash table.

In one example, an input search string 402 received by stream processor 110 is illustrated. In one example, input search string 402 is illustrated with 8 bytes, with each byte represented by a letter illustrated as "Q", "W", "E", "R", "T", "Y", "A", and "S".

In one example, parsing function 310 of string manager 120 may decompose input search string 402 into eight 3 byte tokens, each staggered by 1 byte and overlapping the previous token by two bytes. For example, parsing function 310 decomposes input search string 402 into a token 410 of bytes "Q", "W", and "E", a token 414 of bytes "W", "E", and "R", a token 418 of bytes "E", "R", and "T", a token 422 of bytes "R", "T", and "Y", a token 426 of bytes "T", "Y", and "A", a token 430 of bytes "Y", "A", and "S", a token 434 of bytes "A", "S", and " . . . ", and a token 438 of bytes "S", " . . . ", and " . . . ".

Next, hash function 314 of string manager 120 may hash each of the 8 tokens to a K bit hash table address (AHASH) into a hash row of hash table 450. For example, string manager 120 hashes token 410 into AHASH 412, token 414 into AHASH 416, token 418 into AHASH 420, token 422 into AHASH 424, token 426 into AHASH 428, token 430 into AHASH 432, token 434 into AHASH 436, and token 438 into AHASH 440. As illustrated AHASH 412 is a K bit hash table address to a hash row 452 of hash table 450, AHASH 416 is a K bit hash table address to a hash row 454 of hash table 450, and AHASH 420 is a K bit hash table address to a hash row 456 of hash table 450. In addition, although not illustrated, each of AHASH 424, AHASH 428, AHASH 432, AHASH 436, and AHASH 440 may represent K bit hash table addresses to hash rows in hash array 450.

In one example, K is set to "11" and hash table 450 may include 2048 rows, where each hash table row, starting at a K bit hash table address, may include 8 pairs each including a FIFO pointer and a data tag, as illustrated by P PTR/TAG pairs 330 and P PTR/TAG pairs 332 in FIG. 3. In one example, for each lookup, the 8 tokens with 8 pairs per token yields 64 pairs, each including a FIFO pointer and a data tag, read from hash table 450 for each lookup.

Figure 5:
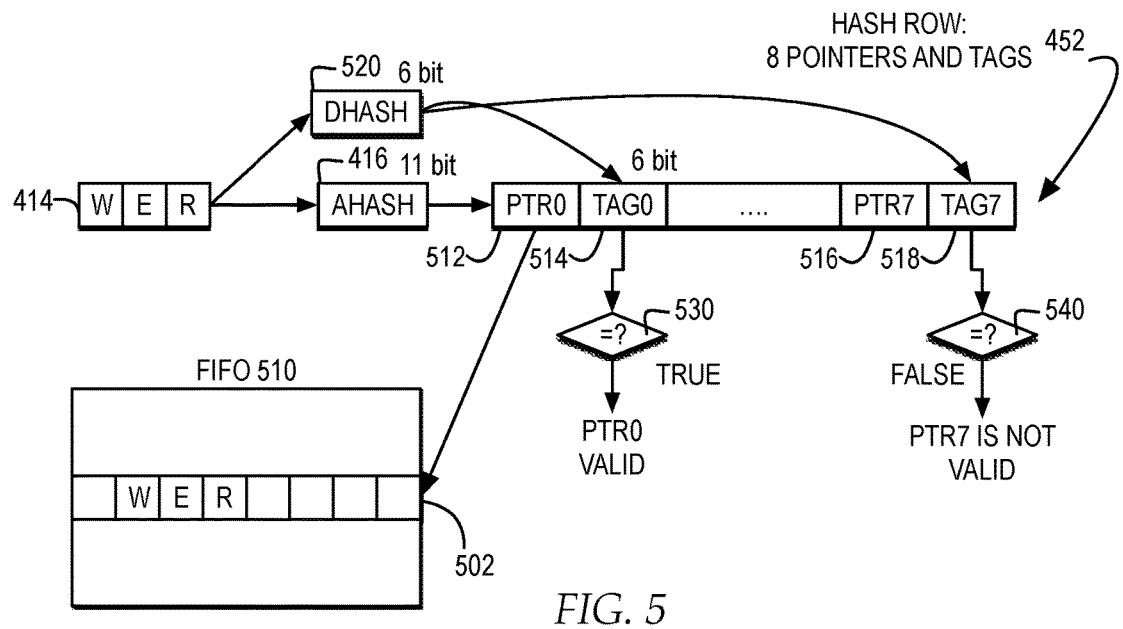
FIG. 5 illustrates a block diagram of one example of comparing a data hash of a token into a hash row within a hash table, the hash row including multiple pairs each including a pointer to an address in a FIFO and a data tag, to determine which pointers in the hash row are valid for the token.

FIG. 5 illustrates a block diagram of one example of comparing a data hash of a token into a hash row within a hash table, the hash row including multiple pairs each including a pointer to an address in a FIFO and a data tag, to determine a selection of pointers in the hash row that are valid for the token.

In one example, FIG. 5 illustrates examples of FIFO pointer and data tag pairs within hash row 452, accessed at the hash row address of AHASH 416, for a token 414. In one example, hash row 452 includes 8 pairs each including a FIFO pointer and a data tag, such as a first pair illustrated with a first FIFO pointer (PTR0) 512 and a first data tag (TAG0) 514 and a last pair illustrated with a last FIFO pointer (PTR7) 516 and a last data tag (TAG7) 518. In one example, each data tag, such as TAG0 514 and TAG7 518 may represent a summary of a previously received token, where the data tag is smaller than the token. For example, each data tag, such as TAG0 514 and TAG7 518, may represent a 6-bit wide summary of previously received tokens that are 3 bytes long.

In one example, each FIFO pointer in hash row 452 identifies a location and length in FIFO 510 that contains buffered data from a data stream. In one example, PTR0 512 points to an entry 502 in FIFO 510 that includes data bytes "W", "E", and "R". In one example, each of the FIFO pointers in hash row 452 may point to the same entry 502 in FIFO 510, or one or more of the FIFO pointers may point to different locations in FIFO 510.

In one example, tag comparator 316 of string manager 120 uses each data tag to test the equality of two tokens to improve the accuracy of FIFO searches through hash table 450. In one example, string manager 120 tests the equality of two tokens by determining whether a current token, such as token 414, and an earlier token, with a DHASH stored in a tag in hash row 452, match.

In one example, hash function 314 may determine a DHASH for an incoming token by hashing the 3-byte token down to a 6-bit tag, such as hashing the 3 bytes of "W", "E", and "R" of token 414 down to a DHASH 520 that is 6 bits. Tag comparator 316 may compare DHASH 520 of token 414 with each data tag in hash row 452 to determine whether DHASH 520 matches each data tag in the hash row identified by AHASH 416. Similarly, tag comparator 316 may compare the separate DHASH of each of token 410, token 418, token 422, token 426, token 430, token 434, and token 438 with the data tags in pairs buffered in each separate hash row in hash array 450 identified by an AHASH of each separate token.

Tag comparator 316 may determine that if two tokens are the same, the DHASH of the two tokens will be the same, indicated as "TRUE". If two tokens are different, the DHASH of each token will be different in most cases. For example, when hash table 450 includes 64 pairs of FIFO pointers and data tags read for a particular 8-byte search string lookup, if two tokens are different, the DHASH of the two tokens will be different by a chance of 63/64 or 98.4% FALSE, but two different tokens may have data tags that test identical by a chance of 1/64 or 1.6% TRUE but a false positive.

In one example, as illustrated at reference numeral 530, DHASH 520 is compared with TAG0 514 and the result of the comparison is "TRUE", reflecting that DHASH 520 matches TAG0 514. With the result of the comparison as "TRUE", tag comparator 316 marks PTR0 512, which is paired with TAG0 514, as "valid". There is a 1/64 chance of a false positive of "TRUE", when two tokens are different, but the DHASH may match a previously stored data tag in hash tag entry 452 and test as identical. However, if even there is a false positive for one token, there are 7 other tokens which may not return a false positive, minimizing any collision-based error to an even smaller percentage.

In one example, as illustrated at reference numeral 540, DHASH 520 is compared with TAG7 518 and the result of the comparison is "FALSE", reflecting that DHASH 520 does not match TAG7 518. With the result of the comparison as "FALSE", tag comparator 316 marks PTR7 518, which is paired with TAG7 518, as "not valid" and no longer considers PTR7 518.

In one example, while comparison of DHASH 520 to the data tags in has tag entry 452 may yield a false positive, the level of error of 1.6% is acceptable and allows for minimized storage of tags with effectively accurate, efficiently determined results. In the example, while storing each 3-byte token or caching a full address tag, such as may be implemented in an L1, L2, or L3 cache, may yield 100% accuracy when comparing incoming data with previously cached entries, storing the full value of 3 byte tokens requires 24 bits. In contrast, string manager 120 stores a smaller, hashed 6-bit data tag that is a summary of a token, which while not yielding 100% accuracy in token comparison, consumes 75% less bits than storing a full token. By string manager 120 storing smaller data tags as a summary of a token, the SRAM array size required for hash table 450 may be minimized, using fewer bits and less silicon area than a cache implemented for storing full tokens or address tags, while providing sufficiently high levels of accuracy.

Figure 6:
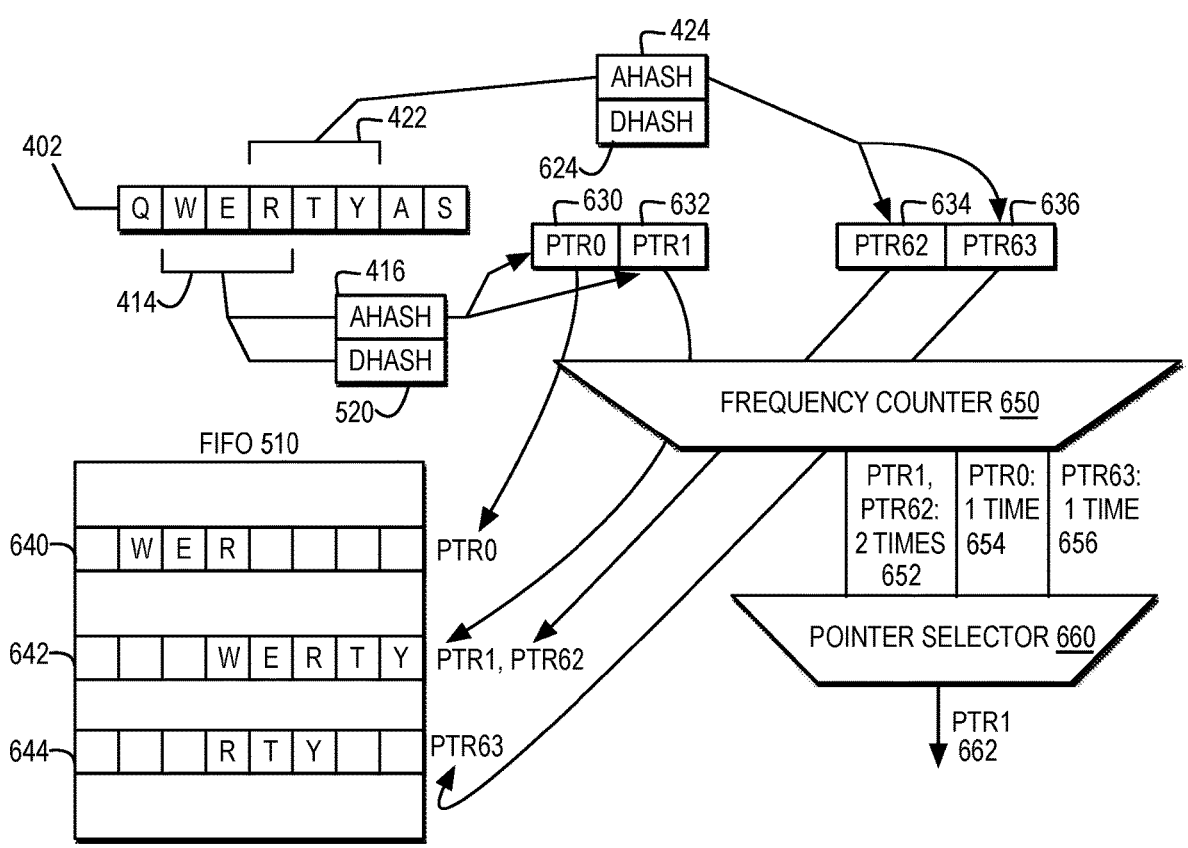
FIG. 6 illustrates a block diagram of one example of an assessment of the frequency of pointer locations applied by valid pointers and a selection of a most frequent pointer.

FIG. 6 illustrates a block diagram of one example of an assessment of the frequency of pointer locations applied by valid pointers and a selection of a most frequent pointer.

In one example, FIG. 6 illustrates the results of tag comparator 316 comparing address hashes and data hashes of two tokens out of the eight tokens into the 64 pointers of hash table 450 to select a selection of pointers paired with data hashes that return a TRUE result when compared. For example, tag comparator 316 determines, based on AHASH 416 and DHASH 520, for token 414, that PTR0 630 and PTR1 632 are valid. In addition, tag comparator 316 determines, based on AHASH 424 and DHASH 624, for token 422, that PTR62 634 and PTR63 636 are valid. While the example in FIG. 6 illustrates valid pointers detected for two tokens out of the eight tokens identified in FIG. 4, in additional or alternate examples, additional valid pointers may be determined from among the 64 pointers of hash table 450 based on comparing address hashes and data hashes of the remaining six of the eight tokens into the 64 pointers of hash table 450.

In one example, PTR0 630 points to a location 640 in FIFO 510, PTR2 632 points to a location 642 in FIFO 510, PTR62 634 points to a location 642 in FIFO 510, and PTR63 636 points to a location 644 in FIFO 510. In one example, a frequency counter 650 of frequency detector 318, counts the frequency at which multiple pointers including a same pair value of a distance and length, point to a same location in FIFO 510.

In one example, frequency counter 650 may output a first count 652 indicating that the location in both PTR1 632 and PTR62 634 is counted two times, a second count 654 indicating that the location in PTR0 630 is counted one time, and a third count 656 indicating that the location in PTR63 636 is counted one time. In one example, a pointer selector 660 of address selector 320 may select a pointer with a pair value that points to the location most frequently pointed to in FIFO 510. As illustrated, pointer selector 660 selects PTR1 632, as a pointer that points to the location most frequently pointed to, by both PTR1 632 and PTR62 634. In one example, pointer selector 660 alternatively may have selected PTR62 634. While FIG. 6 illustrates a determination of a single most frequent pointer location, in additional or alternate examples, address selector 320 may select the top two most frequent pointer locations.

In one example, by selecting the most frequent pointer locations, the probability of selecting the longest possible match in the buffered string in the FIFO increases. In particular, when there are multiple pointers with the same pair value pointing to same location in FIFO 510, there is an increased probability that the input string following the pointer is longer. For example, the buffered string of "W", "E", "R", "T", "Y" pointed to by PTR1 632 and PTR62 634 is longer than the buffered string of "W", "E", "R" pointed to by PTR0 630 or the buffered string of "R", "T", "Y", pointed to by PTR63 636.

Figure 7:
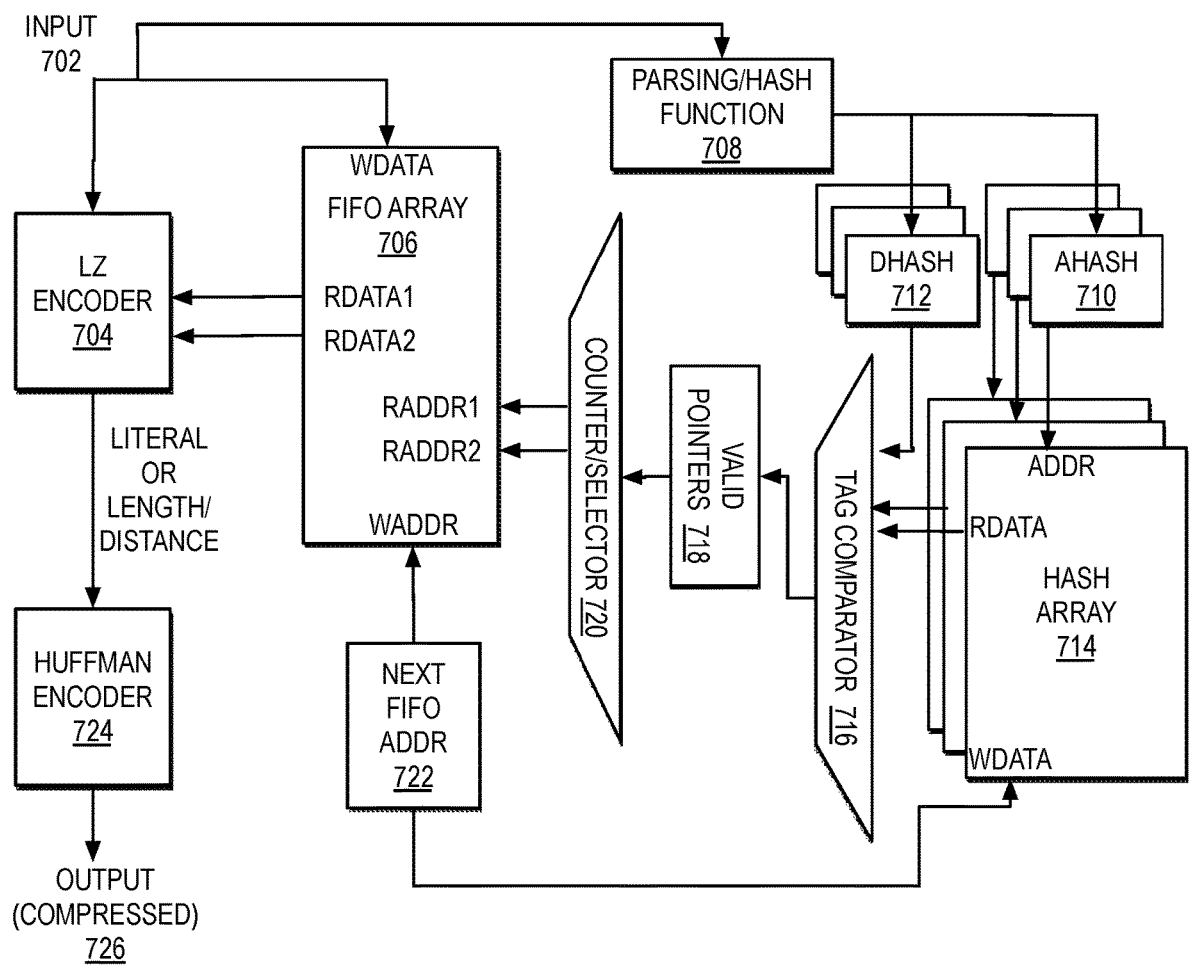
FIG. 7 illustrates a block diagram of one example of a stream processor for compressing data optimized to minimize the collision-based level of error introduced by the hash table for efficient and accurate data lookups in a FIFO.

FIG. 7 illustrates a block diagram of one example of a stream processor for compressing data optimized to minimize the collision-based level of error introduced by the hash table for efficient and accurate data lookups in a FIFO.

In one example, stream processor 700 includes input 702, which may represent a chunk of a data stream. In one example, each of an LZ encoder 704, a FIFO array 706, and a parsing/hash function 708 receive input 702.

In one example, LZ encoder 704 waits for data outputs from FIFO array 706 to determine whether to pass a literal or a length and distance pair to a Huffman encoder 724. In one example, if FIFO array 706 outputs one or more pointer values, of a length and distance pair, from one or both of "RDATA1" and "RDATA2", LZ encoder 704 may pass the length and distance pair to Huffman encoder 724. In one example, if FIFO array 706 does not output a pointer value from either of "RDATA1" and "RDATA2", indicating input 702 does not occur in FIFO array 706, then input 702 is passed as a literal to Huffman encoder 722. In one example, Huffman encoder 724 may perform one or more additional compression steps, such as, but not limited to, compressing literals or lengths with one Huffman tree and compressing distances with another Huffman tree, and outputting the Huffman trees as output (compressed) 726. In one example, Huffman encoder 724 may apply a variable-length code table for encoding one or more symbols in the literal or length and distance passed to Huffman encoder 724. While FIG. 7 is illustrated with compression performed using LZ encoder 704 and Huffman encoder 724, in additional or alternate embodiments, additional or alternate compression encoders may be implemented.

In one example, parsing/hash function 708 may receive input 702 and determine one or more tokens from input 702, determine an address hash for each token, as illustrated by AHASH 710, and determine a data hash for each token, as illustrated by DHASH 712. In one example, parsing/hash function 708 may represent parsing function 310 and hash function 314. In one example, the AHASH from AHASH 710 for each token may be input as an address (ADDR) to read a hash array 714. A tag comparator 716 may receive the PTR/TAG pairs read for each AHASH address, output from RDATA of hash array 714, and compare each TAG in the PTR/TAG pairs with the DHASH from DHASH 712 associated with the read AHASH. In one example, tag comparator 716 may output valid pointers 718, of each pointer paired with a TAG that matches the DHASH. In one example, tag comparator 716 may represent tag comparator 316.

In one example, a counter/selector 720 may receive valid pointers 718 and count a frequency at which one or more FIFO locations are pointed to within valid pointers 718. In addition, counter/selector 720 may determine, from among the frequency counts, the two most frequently pointed to FIFO locations and output the pointers to the two most frequent locations as inputs to "RADDR1" and "RADDR2" of FIFO array 706. In one example, counter/selector 720 may represent frequency detector 318 and address selector 320.

In one example, the data strings at "RADDR1" and "RADDR2" are read from FIFO array 706 and output, with each data pointer, as "RDATA1" and "RDATA2" to LZ encoder 704. In one example, LZ encoder 704 may implement result selector 322 to verify whether the data strings in "RDATA1" and "RDATA2" match input 702, and if verified, to pass the length and distance pairs for the pointers in "RADDR1" and "RADDR2" to Huffman encoder 724. In one example, if at least one the data strings in "RDATA1" and "RDATA2" do not match input 702, LZ encoder 704 may catch a "false positive" and select to pass input 702, rather than a pointer, to Huffman encoder 724.

In one example, string storage 324 may implement functionality for FIFO array 706 to write input 702, received as "WDATA" input to FIFO array 706, to a tail of FIFO array 706 pointed to by a next FIFO address (ADDR) 722. In one example, in addition, string storage 324 may implement functionality for HASH array 714 to shift the current pairs in each entry of hash array 714 to the right and write next FIFO ADDR 722 to the left for each AHASH, paired with the DHASH from among DHASH 712 for each AHASH from among AHASH 710.

Figure 8:
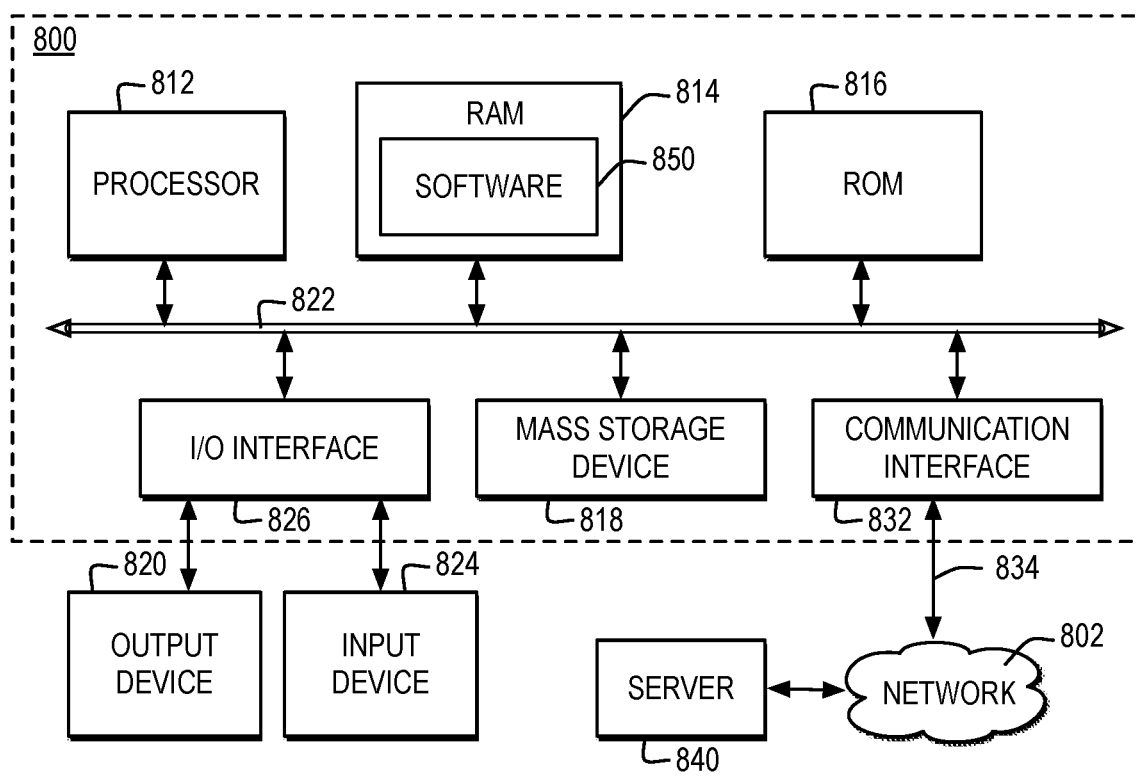
FIG. 8 illustrates a block diagram of one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802. In one example, computer system 800 may include additional or alternate functional components as described with reference to FIG. 1 and FIG. 2.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power.

Processor 812 may be at least one general-purpose processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Computer system 800 may communicate with a remote computer, such as server 840, or a remote client. In one example, server 840 may be connected to computer system 800 through any type of network, such as network 802, through a communication interface, such as communication interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wide area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, a communication interface 832 includes an adapter 834 for connecting computer system 800 to network 802 through a link and for communicatively connecting computer system 800 to server 840 or other computing systems via network 802. Although not depicted, communication interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

Figure 9:
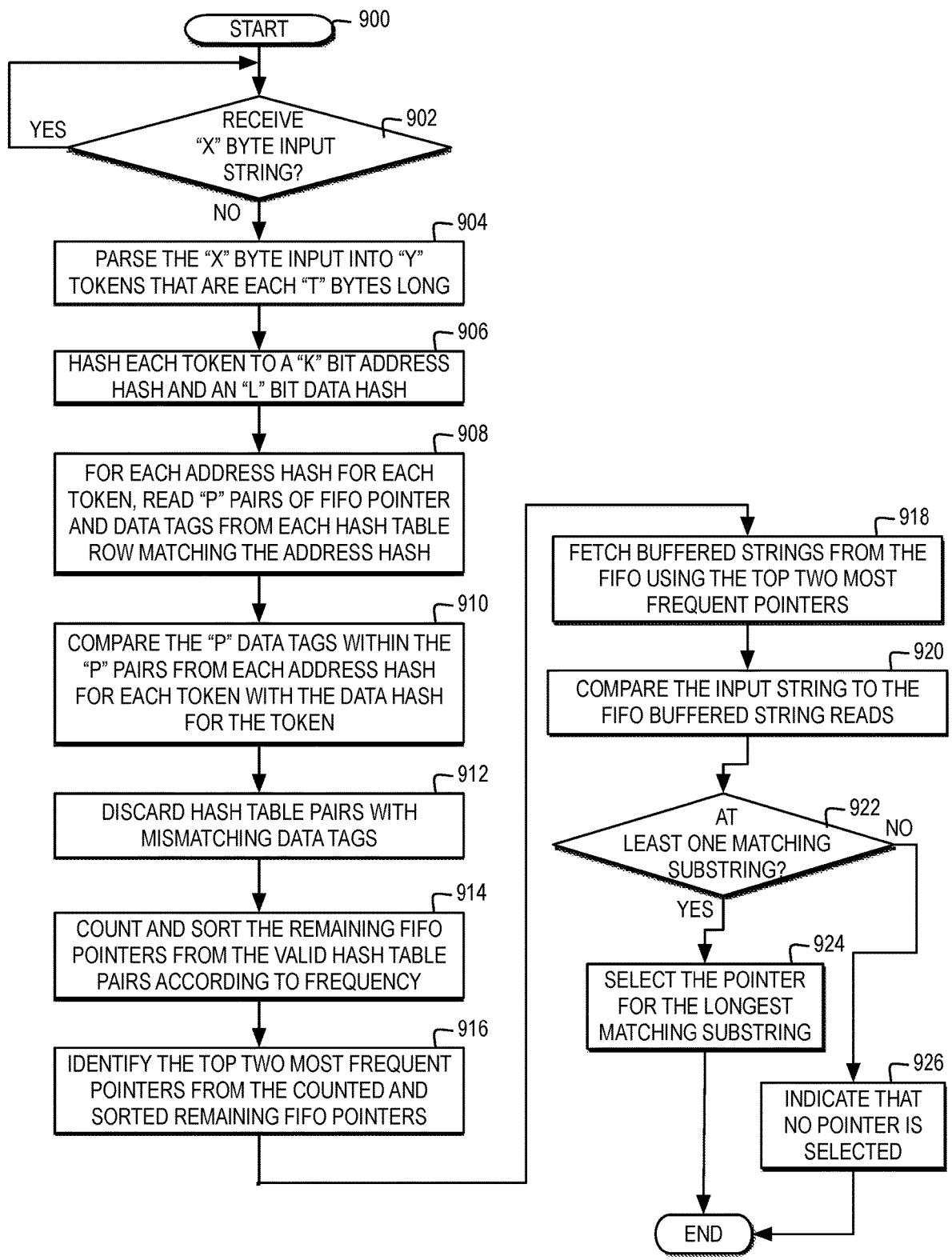
FIG. 9 illustrates high-level logic flowchart of one example of a process and computer program for efficiently and accurately managing string searches of cached data for stream processing applications using a hash table for data lookups to a FIFO.
Figure 10:
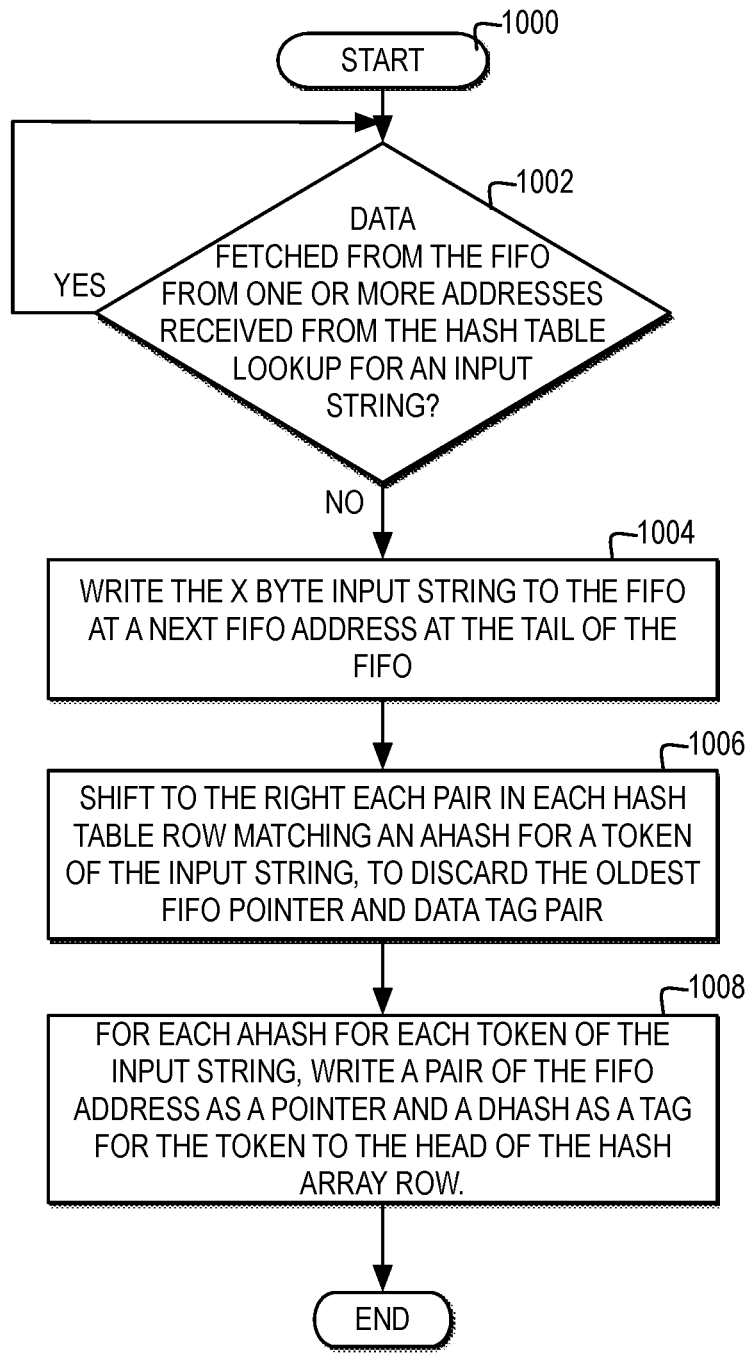
FIG. 10 illustrates a high-level logic flowchart of one example of a process and computer program for efficiently and accurately managing caching of streaming data input for stream processing applications using a hash table for data lookups to a FIFO.

In one embodiment, the operations performed by processor 812 may control the operations of flowchart of FIGS. 9-10 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts in FIGS. 9-10.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

FIG. 9 illustrates a high-level logic flowchart of one example of a process and computer program for efficiently and accurately managing string searches of cached data for stream processing applications using a hash table for data lookups to a FIFO.

In one example, the process and computer program starts at block 900 and thereafter proceeds to block 902. Block 902 illustrates a determination whether an "X" byte input string is received. At block 902, if an "X" byte input string is received, then the process passes to block 904. Block 904 illustrates parsing the "X" byte input into "Y" tokens that are each "T" bytes long. Next, block 906 illustrates hashing each token to a "K" bit address hash and an "L" bit data hash. Thereafter, block 908 illustrates, for each address hash for each token, reading "P" pairs of FIFO pointer and data tags from each hash table row matching the address hash. Next, block 910 illustrates comparing the "P" data tags within the "P" pairs from each address hash for each token with the data hash for the token. Thereafter, block 912 illustrates discarding hash table pairs with mismatching data tags that return a "false" result to filter out "false positives" for an AHASH. Next, block 914 illustrates counting and sorting the remaining FIFO pointers from the valid hash table pairs according to frequency. Thereafter, block 916 illustrates identifying the top two most frequent pointers from the counted and sorted remaining FIFO pointers. Next, block 918 illustrates fetching buffered strings from the FIFO using the top two most frequent pointers. Thereafter, block 920 illustrates comparing the input string to the FIFO buffered string reads from the top two most frequent pointers. Next, block 922 illustrates a determination whether there is at least one substring in the FIFO buffered string reads that matches the input string. At block 922, if there is not at least one substring in the FIFO buffered string reads that matches the input string, then the process passes to block 926. Block 926 indicate that no pointer is selected, as a resulting of no entry in the FIFO matching the input string or a false positive, and the process ends. In a compression application, block 926 may trigger passing the input string as a literal. Returning to block 922, if there is at least one substring in the FIFO reads that match the input string, then the process passes to block 924. Block 924 illustrates selecting the pointer for the longest matching substring, and the process ends. In a compression application, block 924 may trigger passing the pointer to the longest matching substring as a distance and length pair for compression.

FIG. 10 illustrates a high-level logic flowchart of one example of a process and computer program for efficiently and accurately managing caching of streaming data input for stream processing applications using a hash table for data lookups to a FIFO.

In one example, the process and computer program starts at block 1000 and thereafter proceeds to block 1002. Block 1002 illustrates a determination whether data is fetched from the FIFO for one or more addresses received from the hash table lookup for an input string. At block 1002, if data is fetched from the FIFO for one or more addresses received from the hash table lookup for an input string, then the process passes to block 1004. Block 1004 illustrates writing the "X" byte input string to the FIFO at the next FIFO address at the tail of the FIFO. Next, block 1006 illustrates shifting to the right each pair in each hash table row matching an AHASH for a token of the input string, to discard the oldest FIFO pointer and data tag pair. Thereafter, block 1008 illustrates, for each AHASH for each token of the input string, writing a pair of the FIFO address as a pointer and the DHASH as the tag for the token to the head of the hash array row, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions, responsive to a data lookup in a buffer triggered for a search string, to parse the search string into a plurality of tokens, each of the plurality of tokens of a first byte length shorter than a string byte length of the search string, each of the plurality of tokens comprising a staggered selection of bytes of the search string overlapping one another by at least one byte;

program instructions to hash each of the plurality of tokens into a respective address hash of a plurality of address hashes, each respective address hash of a second bit length shorter than the first byte length;

program instructions to hash each of the plurality of tokens into a respective data hash of a plurality of data hashes, each respective data hash of a third bit length shorter than the second bit length;

program instructions to search for a selection of pairs from among a plurality of pairs of a hash table read from at least one address hash of the plurality of address hashes and matching at least one data hash of the plurality of data hashes each row of a plurality of rows of the hash table assigned to a separate address hash, each of the plurality of pairs comprising a pointer to a location in the buffer and a tag with a previous data hash of a previously buffered string in the buffer;

program instructions to identify, from among the selection of pairs, at least one separate location in the buffer most frequently pointed to by two or more pointers within the selection of pairs; and program instructions, responsive to at least one read string from the buffer at the at least one separate location matching at least a substring of the search string, to output the at least one separate location as the response to the data lookup.

2. The computer system according to claim 1, wherein the program instructions, to search for a selection of pairs from among a plurality of pairs of a hash table read from at least one address hash of the plurality of address hashes and matching at least one data hash of the plurality of data hashes, each row of a plurality of rows of the hash table assigned to a separate address hash, each of the plurality of pairs comprising a pointer to a location in the buffer and a tag with a previous data hash of a previously buffered string in the buffer further comprises:

program instructions to discard a remaining selection of the plurality of pairs of the hash table read from the at least one address hash of the search string and not matching the at least one data hash of the search string.

3. The computer system according to claim 1, wherein the program instructions to identify, from among the selection of pairs, at least one separate location in the buffer most frequently pointed to by two or more pointers within the selection of pairs further comprises:
program instructions to count a separate frequency of each a selection of locations of the buffer is pointed to by each separate pointer in the selection of pairs;
program instructions to identify two most frequently pointed to locations from two highest frequencies from among each separate frequency; and
program instructions to set the two most frequently pointed to locations as the at least one separate location.

4. The computer system according to claim 1, wherein the program instructions, responsive to at least one read string from the buffer at the at least one separate location matching at least a substring of the search string, to output the at least one separate location as the response to the data lookup further comprises:
program instructions to read, from the buffer, the at least one read string at the at least one separate location;
program instructions to compare the at least one read string with the search string; and
program instructions, responsive to the at least one read string from the buffer at the at least one separate location not matching at least a substring of the search string, to indicate that no pointer is selected.

5. The computer system according to claim 1, wherein the program instructions, responsive to at least one read string from the buffer at the at least one separate location matching at least a substring of the search string, to output the at least one separate location as the response to the data lookup further comprises:
program instructions, responsive to the at least one read string from the buffer at the at least one separate location matching at least the substring of the search string, to replace, by a compression encoder of the computer system, the search string with the location in the response to the data lookup, the location comprising a distance and a length; and
program instructions, responsive to the at least one read string from the buffer at the at least one separate location not matching at least the substring of the search string, to insert, by the compression encoder, the search string as a literal in the response to the data lookup.

6. The computer system according to claim 1, the stored program instructions further comprising:
program instructions to receive, by a stream processor of the one or more processors, input data;
program instructions to pass, by the stream processor, the input data as the search string into the hash table;
program instructions to pass, by the stream processor, the input data to the buffer;
program instructions to store, by the stream processor, the input data at the tail of the buffer at a next address location;
program instructions to shift, by the stream processor, the plurality of pairs in the plurality of rows to the right to discard each oldest selection of pairs of the plurality of pairs; and
program instructions to store, by the stream processor, the next address location in at least one pair with the at least one data hash in at least one row of the plurality of rows of the hash table pointed to at the at least one address hash.

7. A computer program product comprises a computer readable storage medium having program instructions embodied therewith, wherein the computer readable storage medium is not a transitory signal per se, the program instructions executable by a computer to cause the computer to:
responsive to a data lookup in a buffer triggered for a search string, parse, by the computer, the search string into a plurality of tokens, each of the plurality of tokens of a first byte length shorter than a string byte length of the search string, each of the plurality of tokens comprising a staggered selection of bytes of the search string overlapping one another by at least one byte;
hash, by the computer, each of the plurality of tokens into a respective address hash of a plurality of address hashes, each respective address hash of a second bit length shorter than the first byte length;
hash, by the computer, each of the plurality of tokens into a respective data hash of a plurality of data hashes, each respective data hash of a third bit length shorter than the second bit length;
search, by the computer, for a selection of pairs from among a plurality of pairs of a hash table read from at least one address hash of the plurality of address hashes and matching at least one data hash of the plurality of data hashes, each row of a plurality of rows of the hash table assigned to a separate address hash, each of the plurality of pairs comprising a pointer to a location in the buffer and a tag with a previous data hash of a previously buffered string in the buffer;
identify, by the computer, from among the selection of pairs, at least one separate location in the buffer most frequently pointed to by two or more pointers within the selection of pairs; and
responsive to at least one read string from the buffer at the at least one separate location matching at least a substring of the search string, to output, by the computer, the at least one separate location as the response to the data lookup.

8. The computer program product according to claim 7, further comprising the program instructions executable by a computer to cause the computer to:
discard, by the computer, a remaining selection of the plurality of pairs of the hash table read from the at least one address hash of the search string and not matching the at least one data hash of the search string.

9. The computer program product according to claim 7, further comprising the program instructions executable by a computer to cause the computer to:
count, by the computer, a separate frequency of each a selection of locations of the buffer is pointed to by each separate pointer in the selection of pairs;
identify, by the computer, two most frequently pointed to locations from two highest frequencies from among each separate frequency; and
set, by the computer, the two most frequently pointed to locations as the at least one separate location.

10. The computer program product according to claim 7, further comprising the program instructions executable by a computer to cause the computer to:
read, by the computer, from the buffer, the at least one read string at the at least one separate location;
compare, by the computer, the at least one read string with the search string; and responsive to the at least one read string from the buffer at the at least one separate location not matching at least a substring of the search string, to indicate, by the computer, that no pointer is selected.

11. The computer program product according to claim 7, further comprising the program instructions executable by a computer to cause the computer to:

responsive to the at least one read string from the buffer at the at least one separate location matching at least the substring of the search string, replace, by a compression encoder of the computer, the search string with the location in the response to the data lookup, the location comprising a distance and a length; and responsive to the at least one read string from the buffer at the at least one separate location not matching at least the substring of the search string, insert, by the compression encoder, the search string as a literal in the response to the data lookup.

12. The computer program product according to claim 7, further comprising the program instructions executable by a computer to cause the computer to:

receive, by the computer, input data;

pass, by the computer, the input data as the search string into the hash table;

pass, by the computer, the input data to the buffer;

store, by the computer, the input data at the tail of the buffer at a next address location;

shift, by the computer, the plurality of pairs in the plurality of rows to the right to discard each oldest selection of pairs of the plurality of pairs; and store, by the computer, the next address location in at least one pair with the at least one data hash in at least one row of the plurality of rows of the hash table pointed to at the at least one address hash.

* * * * *